United States Patent
Ohta et al.

(10) Patent No.: US 7,520,165 B2
(45) Date of Patent: Apr. 21, 2009

(54) MICRO STRUCTURE, CANTILEVER, SCANNING PROBE MICROSCOPE AND A METHOD OF MEASURING DEFORMATION QUANTITY FOR THE FINE STRUCTURE

(75) Inventors: Naoki Ohta, Tokyo (JP); Tetsuya Kuwashima, Tokyo (JP)

(73) Assignee: TDK Corporation, Tokyo (JP)

( * ) Notice: Subject to any disclaimer, the term of this patent is extended or adjusted under 35 U.S.C. 154(b) by 91 days.

(21) Appl. No.: 11/422,725

(22) Filed: Jun. 7, 2006

(65) Prior Publication Data

US 2006/0277981 A1 Dec. 14, 2006

(30) Foreign Application Priority Data

Jun. 9, 2005 (JP) ............... 2005-169089

(51) Int. Cl.
*G01B 5/28* (2006.01)
(52) U.S. Cl. .......................................... 73/105
(58) Field of Classification Search .................... 73/105
See application file for complete search history.

(56) References Cited

U.S. PATENT DOCUMENTS

| | | | | |
|---|---|---|---|---|
| 3,095,551 | A * | 6/1963 | Hebert | 338/5 |
| 3,383,907 | A * | 5/1968 | Sikrski | 73/777 |
| 5,437,525 | A * | 8/1995 | Bras | 411/14 |
| 6,033,913 | A * | 3/2000 | Morozov et al. | 436/86 |
| 6,448,553 | B1 | 9/2002 | Itsuji et al. | |
| 6,745,618 | B2 * | 6/2004 | Imai et al. | 73/105 |
| 2004/0050172 | A1 * | 3/2004 | Quandt et al. | 73/779 |
| 2004/0176672 | A1 * | 9/2004 | Silver et al. | 600/345 |

FOREIGN PATENT DOCUMENTS

| | | | |
|---|---|---|---|
| EP | 0 706 052 A2 | | 4/1996 |
| EP | 1 708 291 A2 | | 10/2006 |
| JP | 05-164514 | * | 6/1993 |
| JP | 6-323843 | | 11/1994 |
| JP | 07-71952 | * | 3/1995 |
| JP | 2000-304756 | | 11/2000 |
| WO | WO 2006/123239 A1 | | 11/2006 |

OTHER PUBLICATIONS

Machine assisted English language translation of JP-07-71952.*
Machine assisted English language translation of JP-05-164514.*
M. Tabib-Azar, et al., "Sensing means and sensor shells: a new method of comparative study of piezoelectric, piezoresistive, electrostatic, magnetic, and optical sensors", Sensors and Actuators A, vol. 48, No. 2, 1995, pp. 87-100.
G. Binnig, et al., "Atomic Force Microscope", Physical Review Letters, XP 000603317, vol. 56, No. 9, Mar. 3, 1986, pp. 930-933.

* cited by examiner

*Primary Examiner*—Daniel S Larkin
(74) *Attorney, Agent, or Firm*—Oblon, Spivak, McClelland, Maier & Neustadt, P.C.

(57) ABSTRACT

Highly efficient and highly sensitive sensors of small size are provided in desired position, desired shape and size for a micro structure that causes elastic deformation at least a part thereof. Moreover, utilizing the sensors allows facilitating to assemble and adjust the components, miniaturizing and simplifying the detection circuit, and measuring a local displacement of a fine part of the micro structure. A micro structure is a cantilever in which a beam part causes elastic deformation. This cantilever includes a sensor detecting elastic deformation of a beam part by tunneling effect.

20 Claims, 4 Drawing Sheets

MICRO STRUCTURE, CANTILEVER, SCANNING PROBE MICROSCOPE AND A METHOD OF MEASURING DEFORMATION QUANTITY FOR THE FINE STRUCTURE

BACKGROUND OF THE INVENTION

1. Field of the invention

This invention relates to a micro structure that causes an elastic deformation at least at a part thereof a cantilever composed of the micro structure, a scanning probe microscope providing the cantilever and a method for measuring deformation quantity for the micro structure.

2. Description of the Related Art

As micro structures that cause an elastic deformation at least at a part thereof, for example, there are cantilevers which constitute MFM: Magnetic Force Microscope and AFM: Atomic Force Microscope, which are kinds of SPM: Scan Probe Microscope, in addition, there is the cantilever which constitutes SNOM: Scanning Near-field Optical Microscope.

For example, the cantilever constituting AFM holds a probe in its front end, and the probe is placed closely toward the surface of a specimen, which are fixed on experimental beds or vibrating in high frequency. The laser beam is irradiated on an upper surface nearby the probe that is set lower surface of the front end of the cantilever through optics and thereby, the deflection quantity of the cantilever is measured using intensity ratio of reflection beams from the cantilever detected by a photodetector which is divided to four parts: upper, lower, left and right. The three-dimensional-shapes of unevenness or the like on the surface of the specimen is observed by calculating atomic force working with the probe and the surface of the material from this deflection quantity (for example, see patent document 1). The technology described above is referred to the first prior art as follows.

Additionally, there is the other type of the conventional AFM in which the cantilever is composed of a piezo resistance element and the deflection quantity of the cantilever is measured as a change of the value of the piezo resistance. This type of AFM is provided with a signal detection system that applies constant-voltage-bias to the cantilever and converts detected input current signal to change of resistance to an output voltage signal; an offset signal detection system that detects the component of an offset signal included in the output voltage signal from the signal detection system and removes it (for example, see patent document 2). Hereafter, the technology described above is referred to the second prior art.

[Patent Document 1]
Japanese Patent Publication Number H6-323843 (paragraphs [0008] and [0009], and FIGS. 1 and 2)

[Patent Document 2]
Japanese Patent Publication Number 2000-304756 (claim 1, paragraphs [0010] to [0014], and FIGS. 1 and 3)

SUMMARY OF THE INVENTION

Problems to be Solved by the Invention

To obtain good results of measurement in the first prior art described above, it is required to adjust position relationship among the laser irradiation surface, front end of the cantilever and a photo sensitive surface of the photodetector total three place and to irradiate precisely the laser beam reflected from the front end of the cantilever on a center of the photo sensitive surface of the photodetector. However, the considerable skill is required for the adjustment of the above position relationship, and thus assembly and adjustment of a measuring section of the AFM is not facilitated. Furthermore, since the laser and the photodetector are necessary as the component of the AFM, it is difficult to reduce a space where the measuring section possesses in the AFM, which has obstructed the miniaturization of the AFM.

In contrast, the second prior art can solve the problem of the first prior art described above. However, the second prior art has the following various inconvenience because it uses the piezo resistance element:

(1) The detector circuit is complicated, since the resistance transition of piezo resistance element is extremely small, a Wheatstone bridge circuit or the like is required.

(2) Since the piezo resistance element requires a large area contributing for sensitivity, it is difficult to detect a local displacement of a fine part.

The problems described above in the first prior art and the second prior art are fitted in the case not only cantilever composing of AFM, but also the micro structures that cause the elastic deformation at least a part thereof by physical quantity such as acceleration, pressure, load, displacement or the like in the same way. Namely, it is sometimes required to measure the deformation quantity in several parts for a part or whole structure that cause the elastic deformation in these types of the micro structure; however, the first prior art, as mentioned above, has difficulty of assembly and adjustment for each components, such as the laser, or difficulty of miniaturizing size of all the system.

Additionally, according to the above second prior art, when the deformation quantity for each parts is detected simultaneously, it is required to arrange a lot of Wheatstone bridges or the like; therefore, it is hard wiring through terminals to supply power for each of the piezo resistance element, terminals to detect the current of each of the piezo resistance element, and an outer power supply or detection circuits. Furthermore, in the above-mentioned second prior art, if the region of the surface in the micro structure to form the piezo resistant element has conductivity, it is required to form an insulating layer in the region of the surface.

In view of the above circumstances, it is therefore an object of the present invention to provide micro structure, cantilever, scanning electron microscope, and a method for measuring the deformation quantity for the micro structure.

Means for Solving the Problems

In order to solve the above-mentioned problems, a micro structure in one aspect of the present invention comprises: a micro structure that at least a part of the micro structure causes elastic deformation, wherein said micro structure having a sensor to detect said elastic deformation by a tunneling effect.

Also, in another aspect of the present invention a plurality of said sensors are provided at regions causing said elastic deformation in said micro structure so that a respective axis of members of said plurality of sensors cross at a right angle mutually.

Also, in another aspect of the present invention said sensor uses at least a part of a region which causes said elastic deformation of said micro structure as that component.

Also, in another aspect of the present invention said sensor detects said elastic deformation of said micro structure as a change of electric resistance.

Also, in another aspect of the present invention a resistance area product, that is the product of resistance and surface area, of the sensor is 100 k$\Omega \cdot \mu m^2$ or less.

Also, in another aspect of the present invention said sensor comprises: an insulating layer that forms a tunneling barrier; an upper electrode that is conductive and is formed on upper surface of said insulating layer; and at least a part of said micro structure which has conductivity and is used for a lower electrode of said insulating layer.

Moreover, in another aspect of the present invention is a cantilever of a scanning probe microscope, comprising a micro structure, in which when a front end of said cantilever is made to approach to a specimen surface, said front end is made to scan the specimen in two dimensions relatively, said scanning probe microscope detects physical quantity working with said specimen surface and said front end of said cantilever as deformation quantity.

Also, in another aspect of the present invention is a cantilever of a scanning probe microscope, in which, when a front end of said cantilever is made to approach to a specimen surface, said front end is made to scan the specimen in two dimensions relatively, said scanning probe microscope detects physical quantity working with said specimen surface and said front end of said cantilever as deformation quantity.

Also, in another aspect of the present invention is a cantilever of a scanning probe microscope, in which, when a front end of said cantilever is made to approach to a specimen surface, said front end is made to scan the specimen in two dimensions relatively, said scanning probe microscope detects physical quantity working with said specimen surface and said front end of said cantilever as deformation quantity.

Also, in another aspect of the present invention is a cantilever of a scanning probe microscope, in which, when a front end of said cantilever is made to approach to a specimen surface, said front end is made to scan the specimen in two dimensions relatively, said scanning probe microscope detects physical quantity working with said specimen surface and said front end of said cantilever as deformation quantity.

Also, in another aspect of the present invention is a cantilever of a scanning probe microscope, in which, when a front end of said cantilever is made to approach to a specimen surface, said front end is made to scan the specimen in two dimensions relatively, said scanning probe microscope detects physical quantity working with said specimen surface and said front end of said cantilever as deformation quantity.

Also, in another aspect of the present invention is a cantilever of a scanning probe microscope, in which, when a front end of said cantilever is made to approach to a specimen surface, said front end is made to scan the specimen in two dimensions relatively, said scanning probe microscope detects physical quantity working with said specimen surface and said front end of said cantilever as deformation quantity.

Also, in another aspect of the present invention is a scanning probe microscope, wherein the scanning probe microscope comprises the cantilevers discussed above.

Also, in another aspect of the present invention a method of measuring deformation quantity for a micro structure comprises: providing several sensors to detect elastic deformations by tunneling effect in the micro structure that causes the elastic deformation; and detecting the elastic deformation of each part of said micro structure as change of electric resistance by the several sensors.

Also, in another aspect of the present invention is a method of measuring deformation quantity for the micro structure wherein said several sensors are provided at regions causing said elastic deformations in said micro structure so that mutual axis of member of said sensors cross at right angle.

Advantage of the Invention

According to this invention, highly efficient and highly sensitive sensors which size is extremely small can be provided in desired position, desired shape and size for the micro structure that causes the elastic deformation at least a part thereof. Moreover, it is convenient to assemble and adjust the parts because the number of the parts is few to detect the elastic deformation for the micro structure. Furthermore, in comparison with using piezo resistance element, which has extremely small the change of resistance as the sensor, the present invention enables to simplify the composition with miniaturizing the detection circuit; Moreover, it can also detect a local displacement of a fine part of the micro structure.

EXPLANATION OF REFERENCE NUMBERS 1, 31 cantilever
2, 32 detection circuit
2a, 2b, 2c input-output terminal
3 to 5 lead wire
11 mechanism part
12, 12x, 12y sensor
12a, 12xa, 12ya insulating layer
12b, 12xb, 12yb upper electrode
13 pillar part
13a, 14c one side surface
13aa upper end part
14 beam part
14a one end part
14b another end part
14d upper surface
15 probe
21 micro structure
22, 23 support member

DESCRIPTION OF THE PREFERRED EMBODIMENTS

Embodiments of the Preferred Invention

Embodiment 1

Figure 1:
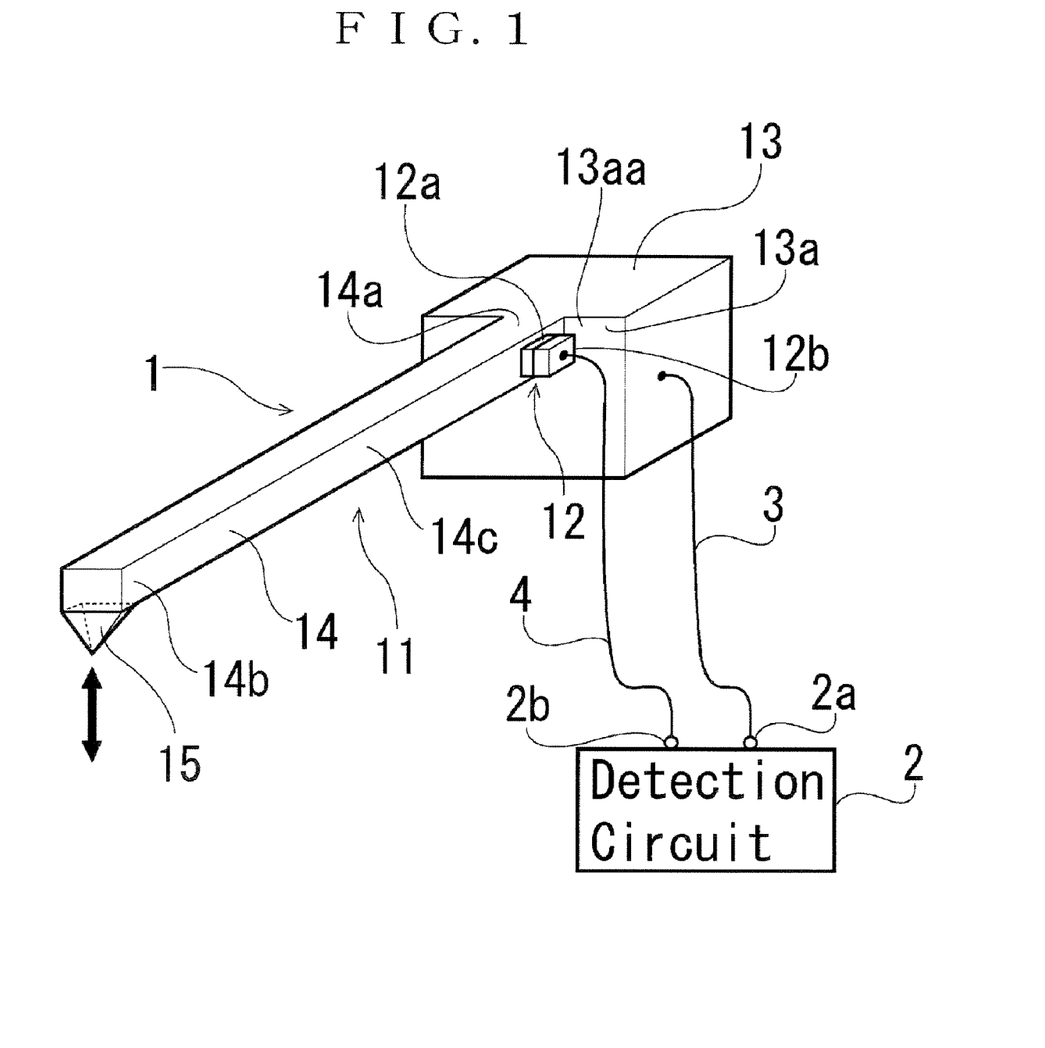
FIG. 1 is schematic illustration of the composition of the cantilever and the detection circuit shown by perspective view according to the embodiment 1 of the present invention.
Figure 2:
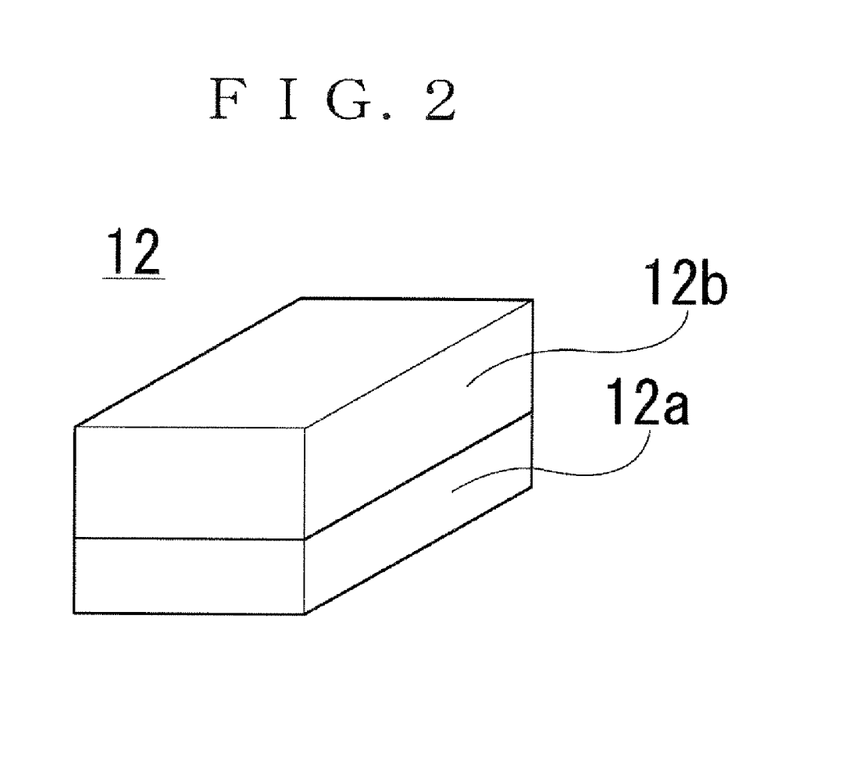
FIG. 2 is a perspective view showing the appearance of composition of the sensor, which is provided to the cantilever shown in FIG. 1.

FIG. 1 is schematic perspective view of the composition of cantilever 1 and the detection circuit 2 according to the first embodiment of the present invention; FIG. 2 is a perspective view showing the appearance of composition of sensor 12, which is provided to cantilever 1 shown in FIG. 1. Cantilever 1, in this example, is constituted MFM, AFM or SNOM, which is a kind of SPM, and cantilever 1 is roughly constituted mechanism part 11 and sensor 12. The mechanism part 11 consists of pillar part 13, beam part 14 and probe 15. The pillar part 13, at least the surface of its part, consists of conductor and shapes approximately rectangular parallelepiped. Beam part 14, at least the surface of its part, consists of conductor and shapes approximately rectangular parallelepiped. In the beam part 14, one end part 14a is connected to approximately the center of upper end part 13aa, which is upper part of one side surface 13a, which is one end of pillar part 13; another end part 14b is prolonged approximately horizontally with the perpendicular axis of pillar part 13. Pillar part 13 and beam part 14 are formed in one, and they are shaped as like a beam which one end is held and projects. Probe 15 is held on the under surface of another end part 14b of beam part 14. The probe 15 shapes approximately four pyramid, and the tip faced to downward. An example of the approximate size of the pillar part 13 is 100 µm in width, 100 µm in length, and 150 µm in height. An example of the approximate size of beam part 14 is 200 µm in width, 50 µm in length, and 1 µm in thickness.

Sensor 12 is formed on one side surface 14c of beam part 14 to one end part 14a vicinity, that is, close to the connection part of beam part 14 and pillar part 13. Sensor 12 is a kind of tunneling effect element and is composed of insulating layer 12a of composed tunneling barrier and upper electrode 12b, shown in FIG. 2. The insulating layer 12a is shaped approximately rectangular pillar, and it is composed of, for example, an aluminum oxide ($Al_2O_3$), a magnesium oxide (MgO) or the like. The size of the insulating layer 12a is, for example, 100 nm in width, 100 nm in length, and 1 nm in thickness. Upper electrode 12b, shaped approximately rectangular pillar, consists of, for example, tantalum (Ta) or the like, which is non-magnetic material and good conductor. The size of upper electrode 12b is, for example, 100 nm in width, 100 nm in length, and 30 nm in thickness. In addition, the ratios of the sizes of each part illustrated in FIG. 1 and FIG. 2 are not accorded with the sizes described as above examples.

Moreover, the reason to set the size, shape and material as described above for sensor 12 is explained. Sensor 12 is, needless to say, better to be smaller and smaller in order to detect a local displacement of a fine part; however, if sensor 12 is formed smaller, generally resistance of sensor 12 becomes high and there is also a problem in regard to processing. Moreover, if resistance of sensor 12 is high (for example, 100 MΩ or more), it is required to use a circuit element, which is not general, for power supply of direct current because the higher voltage is need to be applied for both sides of insulating layer 12a. Additionally, if resistance of sensor 12 is low (for example, 10Ω or less), it will occur leak current in insulating layer 12a. Thus, resistance value of sensor 12 is desirable from 100 Ω to 1 MΩ.

To maintain the resistance value of sensor 12 between 100 Ω and 1 MΩ if sensor 12 is smaller, it is needed to hold low resistance area product RA which is the product of value of resistance and the area of sensor 12; these inventors diligently investigate and are ascertained that RA is desirable 100 kΩ·µm² or less. Thus, sensor 12 is 100 nm in width, 100 nm in length in the Embodiment 1.

Furthermore, it is described that a relationship between resistance area product RA and the thickness of insulating layer 12a, which is composed of sensor 12. These inventors consider that sensor 12 behaves based on following principles (tunneling effect):

(a) If physical quantity such as acceleration, pressure, load, displacement or the like is applied to sensor 12, the physical quantity is transmitted to insulating layer 12a, which is composed of tunneling barrier, and insulating layer 12a is deflected. The most conspicuous deflection of insulating layer 12a is the thickness of insulating layer 12a.

(b) If the thickness of insulating layer 12a transforms, the resistance value of insulating layer 12a changes as like a logarithmic function because it is changed the probability of tunneling transition of electron, which tunnels the tunnel barrier.

Thus, the thickness of sensor 12 is important in order to obtain large change of the resistance value by the applied physical quantity. As for resistance area product RA in the area which the thickness of metal aluminum before natural oxidation is 1.3 nm or less when composing insulating layer 12a of sensor 12 by aluminum-oxide ($Al_2O_3$), it is known that the dependency for the thickness of the aluminum is large and large resistance change as sensor 12 is obtained. Since the 1.3 nm of aluminum will be 2.0 nm to 2.5 nm membrane of aluminum oxide, in Embodiment 1 of the present invention, the thickness of insulating layer 12a sets approximately 1 nm. These inventors experimentally find that the resistance area product RA changes 70% in linear when the thickness of the aluminum changes 10%.

Moreover, as described above, the fact that sensor 12 is formed on one side surface 14c of beam part 14 to one end part 14a vicinity, that is, close to the connection part of beam part 14 and pillar part 13, is because the above-mentioned place deflects most according to displacement of the probe 15, in beam part 14, thereby it can be obtained high detection sensitivity by detecting the above-mentioned deflection quantity of beam part 14 as the resistance change of sensor 12 on the basis of the above-mentioned operational principle of sensor 12. Furthermore, the fact that the shapes for insulating layer 12a and upper electrode 12b is approximately rectangular pillar and the shapes of the tunnel junction is rectangular, is because process present cheapness was seriously considered, form of insulating layer 12a and upper electrode 12b and form of tunnel junction, if in regard to these processing there is no problem, with any kind of shapes such as approximately cylindrical condition and circular condition are good.

Cantilever 1 described above, except for insulating layer 12a, can be formed by using a thin-film formation technique such as chemical vapor deposition (CVD), vacuum evaporation or sputtering, a lithography technique, etching technique or plating technique. On the other hand, when insulating layer 12a, which is composed of sensor 12, is made of aluminum oxide ($Al_2O_3$), it is formed by any one of the following methods: (1) natural oxidation in air after forming metallic aluminum in the part described above; (2) oxidation by the plasma oxidation method in air or in a vacuum after metallic aluminum is formed in the part described above; (3) forming an aluminum oxide ($Al_2O_3$) film using a thin-film-formation technique such as CVD, vacuum evaporation or sputtering in the part described above.

In detection circuit 2, input-output terminal 2a is electrically connected to pillar part 13 via lead wire 3 which is made of cupper (Cu) or the like. Moreover, in the detection circuit 2, input-output terminal 2b is electrically connected to upper electrode 12a via lead wire 4 which is made of cupper (Cu) or the like. Detection circuit 2 applies constant voltage or turn on constant current to sensor 12, detects the change of resistance as the change of current or voltage. Then, detection circuit 2 visualizes surface profile of the specimen based on the above detection result and displays to the display (not shown in the figure).

In the following, it is described about the behavior of cantilever 1 explained above for applying to the AFM. First, the specimen that the surface profile should be observed is fixed on the XYZ stage (not shown in the figure). This XYZ stage is driven by a driving circuit and is composed for enabling to two-dimensionally scan the surface (in XY directions). Then, tip of probe 15, which is composed of cantilever land is described in the FIG. 1, is placed close to the surface of the specimen (not shown in the figure). Then, detection circuit 2 applies constant voltage or turns on constant current to sensor 12 via lead wire 3, lead wire 4, pillar part 13 and beam part 14.

Next, driving XYZ stage in the drive circuit, when it does two dimensional scan in surface direction (XY direction), the beam part 14 of the cantilever 1, which keeps probe 15, bends with atomic force working with the surface of the specimen and probe 15. The resistance value of sensor 12 is changed because the thickness of insulating layer 12*a* is changed by deflecting beam part 14, composing sensor 12 which is formed on one side surface 14*c* of beam part 14 to one end part 14*a* vicinity. Then, detection circuit 2 detects the change of resistance change as the change of current or voltage, and visualizes surface profile of the specimen based on the above detection result and displays to the display (not shown in the figure).

As described above, in the embodiment 1 of the present invention, sensor 12, which detects the elastic deformation of beam part 14 by tunneling effect, is formed on one side surface 14*c* of beam part 14 to one end part 14*a* vicinity, that is, close to the connection part of beam part 14 and pillar part 13 on cantilever 1 in which beam part 14 causes elastic deformation. This sensor 12 uses cantilever 1 by itself as the lower electrode. Additionally, in the embodiment 1 of the present invention, it is capable to form sensor(s) 12, which sensitivity and efficiency are high, size is extremely small, and it can be provided in desired position, desired shape and size, with cantilever 1 itself while processing cantilever 1.

Thus, the present invention can be solved the problem of the first prior art, which have difficulty for being assembly and adjustment of each part, laser or the like, and for miniaturization of whole apparatus. Additionally, the present invention can have simple composition of the detection circuit as compared with the piezo resistance element, which requires Wheatstone bridge circuit or the like because of extremely low change of resistance; it can also detect local displacement of the fine part because the area contributing the pressure is small as compared with the piezo resistance element.

Embodiment 2

In the embodiment 1, the example is shown that the present invention is applied to the cantilever of the scanning probe microscope; however, the present invention is not restricted to this application. For example, the present invention can apply to the micro structure such as micro machine or the like, that causes an elastic deformation at least a part thereof by accepting physical quantity such as acceleration, pressure, load, displacement, or the like. Namely, it is sometimes required to measure the deformation quantity in several parts for a part or whole structure that cause the elastic deformation in these types of the micro structure; we answer this request with the method of showing below in the application of embodiment 2.

Figure 3:
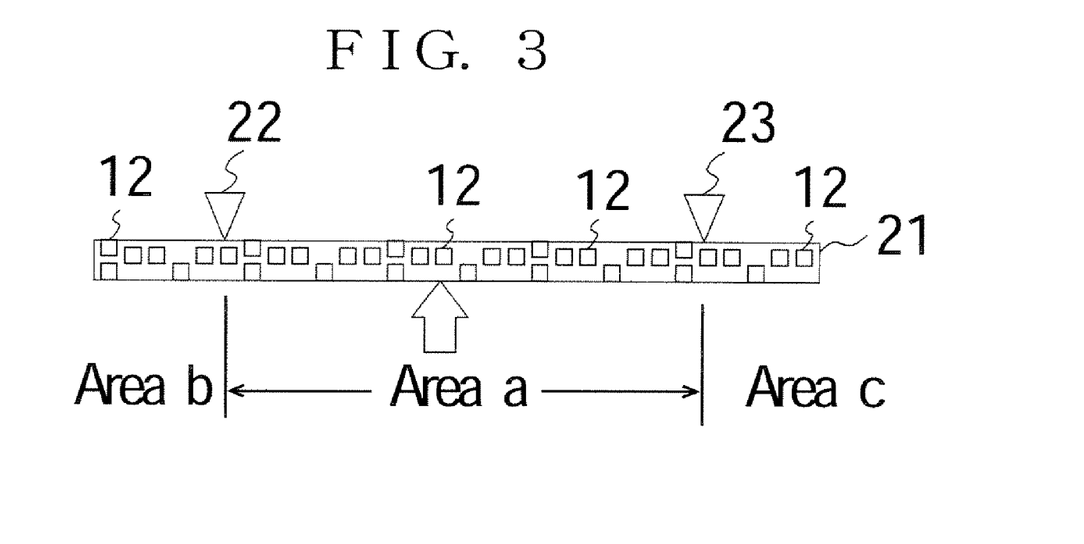
FIG. 3 is the schematic illustration to describe an example of the measuring the deformation quantity means for the micro structure according to the embodiment 2 of the present invention.

FIG. 3 is the schematic illustration to describe an example of method for measuring the deformation quantity means for the micro structure according to the embodiment 2. In the FIG. 3, at least its surface of micro structure 21 has conductivity, and it shapes approximately rectangular pillar, in addition to cause the elastic deformation for entire region. In front of this micro structure 21, several sensors 12, as shown in FIG. 2, are provided at specified interval. Additionally, support member 22 and support member 23, as shown in the FIG. 3, hold the micro structure 21, on the upper surface at specified interval.

In this condition, as shown in the FIG. 3, if approximately center part of micro structure 21 is deflected for a designated length to upward by adding a kind of force from down to up at approximately the center part of the lower surface of micro structure 21. Accordingly, because as for the insulating layer 12*a* which forms the plural sensors 12 which are provided in the front of micro structure 21, the thickness changes according to the deflection of the region of the micro structure 21 where particular sensor 12 is provided, resistance value of each sensor 12 changes. In this case, contacting each pair of the probes to the surface of upper electrode 12*b* and the adjacent surface of micro structure 21 simultaneously, it measures the resistance value for each sensor 12. Each detection circuit connecting to the pair of the probes (not shown in the figure) detects the change of resistance value for the corresponding sensor 12 as the change of current or voltage.

As described above, in the embodiment 2 of the present invention, it combines micro structure 21 itself as the lower electrode. Therefore, the composition of micro structure 21 including the sensors is able to be simplified because it is not necessary to form insulating layer, connected terminals of the sensor, or the like on the territory surface provided the sensors in the example of the second prior art. In addition, it is possible to measure simultaneously the deformation quantity in several parts for a part or whole structure that cause the elastic deformation, which could not be measured until recently. Thus, it is able to get hold that the distribution of the deflection for micro structure 21.

Embodiment 3

Figure 4:
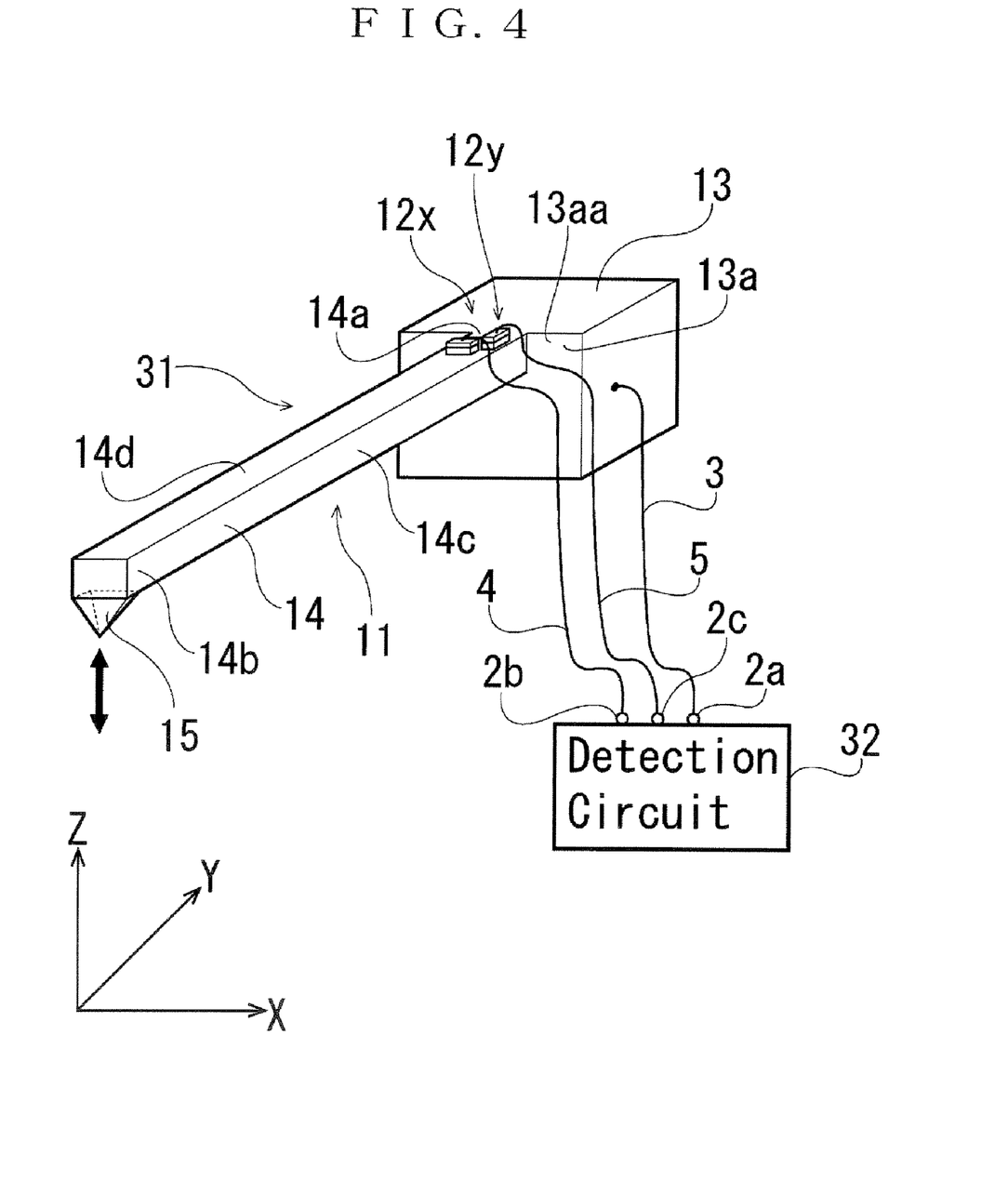
FIG. 4 is the schematic illustration of composition of the cantilever and the detection circuit by perspective view according to the embodiment 3 of the present invention.
Figure 5:
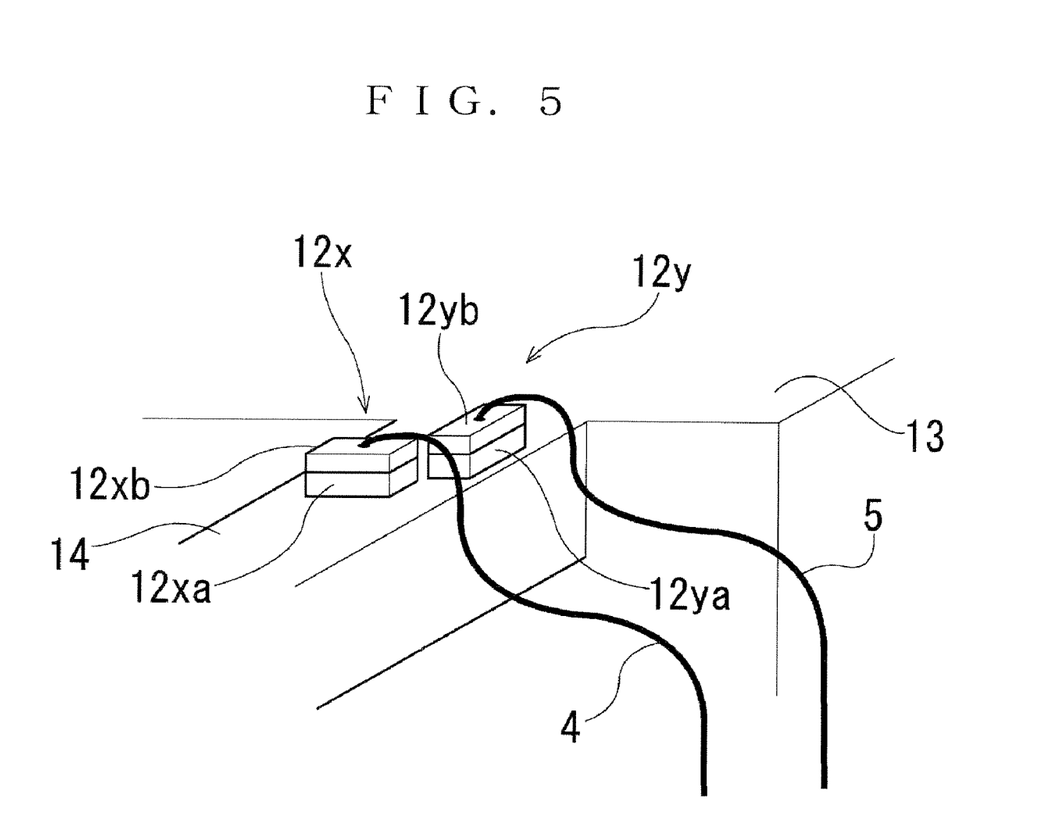
FIG. 5 is the partly enlarged perspective view of cantilever shown in the FIG. 4.

FIG. 4 is the schematic illustration of composition of cantilever 31 and the detection circuit 32 by perspective view, and FIG. 5 is the partly enlarged perspective view of cantilever 31, which is shown in the FIG. 4. In FIG. 4 and FIG. 5, the same marks are given in the parts corresponding to the part in FIG. 1 and it is omitted the description. In cantilever 31 shown in FIG. 4 and FIG. 5, the sensor 12*x* and 12*y* are newly formed, which is substituted for sensor 12 shown in FIG. 1.

The sensor 12*x*, as shown in the FIG. 4 and FIG. 5, is formed parallel to cross direction (x-axis) of beam part 14 on upper surface 14*d* of beam part 14 to one end part 14*a* vicinity, that is, close to the connection part of beam part 14 and pillar part 13. On the other hand, the sensor 12*y*, as shown in the FIG. 4 and FIG. 5, is formed parallel to axis of member direction (y-axis) of beam part 14 on upper surface 14*d* of beam part 14 to one end part 14*a* vicinity, that is, close to the connection part of beam part 14 and pillar part 13. In brief, the sensor 12*x* and the sensor 12*y* are formed, so that the mutual axis of member crosses, on upper surface 14*d* of beam part 14.

The sensor 12*x* and 12*y*, are a kind of tunnel effect element, as shown in the FIG. 5, and they are composed of insulating layer 12*xa* and 12*ya* consisting of tunneling barrier with upper electrode 12*xb* and 12*yb*, respectively. The insulating layer 12*xa* and 12*ya* are composed of, for example, an aluminum oxide $Al_2O_3$, a magnesium oxide, MgO, or the like, and they are shaped approximately rectangular parallelepiped. The size of insulating layer 12xa and 12ya are, for example, 100 nm in length, 30 nm in width, and 1 nm thickness. The upper electrode 12xb and 12yb consists of, for example, tantalum (Ta) or the like, which is non-magnetic material and good conductor, and they are shaped approximately rectangular parallelepiped. The size of upper electrode 12xb and 12yb is, for example, 100 nm in length, 30 nm in width, and 30 nm thicknesses. Moreover, in FIG. 4 and FIG. 5, the ratios of the sizes for each part illustrated are not accorded with the sizes described above examples. Additionally, because concerning the reason to set the size, shape, material for the sensor 12x and 12y, and the method for forming the sensor 12x and 12y what is expressed concerning sensor 12 in the embodiment 1 is applicable that way, for which the description is omitted.

In detection circuit 32, input-output terminal 2a is electrically connected to pillar part 13 of cantilever 31 via lead wire 3 which is made of cupper (Cu) or the like. Additionally, in the detection circuit 32, input-output terminal 2b is electrically connected to the upper electrode 12xa of the sensor 12x via lead wire 4 which is made of cupper (Cu) or the like, and input-output terminal 2c is electrically connected to the upper electrode 12ya of the sensor 12y via lead wire 5 which is made of cupper (Cu) or the like. The detection circuit 32 applies constant voltage or turns on constant current to sensor 12x and 12y, detects respectively the respective change in resistance of sensor 12x and 12y as the change of current or voltage. Moreover, the detection circuit 32 visualizes surface profile of the specimen based on the above detection result and displays to the display (not shown in the figure).

In the following, it is described about the behavior of cantilever 31 explained above for applying to the AFM. First, the specimen that the surface profile is to be observed is fixed on the XYZ stage (not shown in the figure). This XYZ stage is driven by the driving circuit and is composed for enabling to two-dimensionally scan the surface (in XY directions). Then, tip of probe 15, which is composed of cantilever 31 and described in the FIG. 4 and FIG. 5, is placed close to the surface of the specimen (not shown in the figure). Then, the detection circuit 32 applies constant voltage or turns on constant current to sensor 12x and 12y via lead wire 3 to 5, pillar part 13, and beam part 14.

Next, driving XYZ stage in the drive circuit, when it does two dimensional scan in surface direction (XY direction), the beam part 14 of the cantilever 1, which keeps probe 15, bends with atomic force working with the surface of the specimen and probe 15. Due to the fact that beam section 14 bends, because thickness of insulating layer 12xa and 12ya which respectively form sensor 12x and 12y which is formed on upper surface 14d of beam part 14 to one end part 14 a vicinity, changes respectively, value of resistance of sensor 12x and 12y changes respectively. The detection circuit 32 detects the change of resistance change of sensor 12x and 12y as the change of current or voltage, and visualizes surface profile of the specimen based on the above detection result and displays to the display (not shown in the figure).

As shown in the above, in the embodiment 3 of the present invention, on cantilever 31 in which beam part 14 causes elastic deformation, sensor 12x and 12y, which detect the elastic deformation of beam part 14 by tunneling effect, are formed respectively parallel to cross direction and axis of member direction of beam part 14 on upper surface 14d of beam part 14 to one end part 14a vicinity, that is, close to the connection part of beam part 14 and pillar part 13. These sensor 12x and 12y use cantilever 31 by itself as the lower electrode. Additionally, in the embodiment 3 of the present invention, it is capable to form sensors 12x and 12y, which sensitivity and efficiency are high, size is extremely small, and it can be provided in desired position, desired shape and size, with cantilever 31 itself while processing cantilever 31.

According to the embodiment 3 of the present invention, while it is capable to acquire the similar effects of the above-mentioned embodiment 1, it can measure the relative slope faced to the scanning direction of cantilever 31. Furthermore, it is capable to acquire the similar effects of the above by forming sensor 12x and 12y respectively parallel to cross direction and axis of member direction of beam part 14 on lower surface 14d of beam part 14 of cantilever 31 to one end part 14a vicinity, that is, close to the connection part of beam part 14 and pillar part 13.

As mentioned above, although it is described the embodiments of the present invention by referring to the figures, the definite composition is not limited the above embodiments, and an alteration of plan can be included in the present invention without deviating from the gist of the present invention.

For instance, in the above embodiment 1 and 3, it is shown the examples that cantilever 1 or 31 is fixed and the specimen that the surface profile should be observed is two-dimensionally scanned on the surface direction (in XY directions); however, it is not limited to the examples, and it is possible that the above mentioned material is fixed and cantilever 1 or 31 is two-dimensionally scanned on the surface direction (in XY directions).

Moreover, it is not limited that the examples shown in the above described embodiment 2, which sensors 12 are only provided in front of micro structure 21 (see FIG. 3). For example, sensors 12 can be provided to upper surface or the lower surface of micro structure 21. The distribution of the twist value or the like of micro structure 21 can be measured if it is composed in this manner.

Furthermore, it is not limited that the examples shown in the embodiment 2, which the method to measure resistance value of each sensor 12 by contacting each pair of the probes (not shown in the figure) to the surface of upper electrode 12b and the adjacent surface of micro structure 21 simultaneously. For example, it can be composed that: while connecting one lead wire on micro structure 21, the other lead wire is connected to each electrode 12b of respective sensor 12. Then, it is composed that each lead wire is connected to a measuring instrument such as digital multi meter or the like (not shown in the figure), and the resistance value of each sensor 12 is acquired by measuring instrument in parallel or switch sequentially. The composition in this manner can easily measure the distribution of the deformation quantity for micro structure 21.

Additionally, in each embodiment described above, each technology can be applied mutually if there is no inconsistency or problem in the purpose and the composition.

What is claimed is:

1. A micro structure in which at least a part of the micro structure causes elastic deformation, the micro structure comprising:
   a plurality of sensors to detect said elastic deformation by a tunneling effect, said plurality of sensors being positioned on a same surface of said part of the micro structure so that in at least two sensors of the plurality of sensors respective longer axes of each of members of said two sensors of said plurality of sensors cross at right angles mutually,
   wherein each of said sensors comprises an insulating layer that forms a single tunneling barrier between a lower electrode and an upper electrode that have conductivity together.

2. The micro structure of claim 1, wherein said lower electrode and said upper electrode planarly face each other across said insulating layer that forms said single tunneling barrier.

3. The micro structure of claim 2, wherein thickness of said insulating layer that forms said single tunneling barrier is less than or equal to 2.5 nm.

4. The micro structure of claim 1, wherein at least a part of said micro structure has conductivity and is used for said upper electrode or said lower electrode.

5. The micro structure of claim 1, wherein said sensor detects said elastic deformation of said micro structure as a change of electric resistance by a change of tunneling current.

6. The micro structure of claim 1, wherein a resistance area product, that is the product of resistance and surface area, of the sensor is 100 k$\Omega \cdot \mu m^2$ or less.

7. A cantilever of a scanning probe microscope, comprising:
a micro structure in which at least a part of the micro structure causes elastic deformation, said micro structure comprising:
a plurality of sensors to detect said elastic deformation by a tunneling effect, said plurality of sensors being positioned on a same surface of said part of the micro structure so that in at least two sensors of the plurality of sensors respective longer axes of each of members of said two sensors of said plurality of sensors cross at right angles mutually,
wherein each of said sensors comprises an insulating layer that forms a single tunneling barrier between a lower electrode and an upper electrode that have conductivity together;
wherein
when a front end of said cantilever is made to approach a specimen surface, said front end is made to scan the specimen in two dimensions relatively, and said scanning probe microscope detects a physical quantity working with said specimen surface and said front end of said cantilever as a deformation quantity.

8. The cantilever of claim 7, wherein said lower electrode and said upper electrode planarly face each other across said insulating layer that forms said single tunneling barrier.

9. The cantilever of claim 8, wherein thickness of said insulating layer that forms said single tunneling barrier is less than or equal to 2.5 nm.

10. The cantilever of claim 7, wherein at least a part of said micro structure has conductivity and is used for said upper electrode or said lower electrode.

11. The cantilever of claim 7, wherein said sensor detects said elastic deformation of said micro structure as a change of electric resistance by a change of tunneling current.

12. The cantilever of claim 7, wherein a resistance area product, that is the product of resistance and surface area, of the sensor is 100 k$\Omega \cdot \mu m^2$ or less.

13. A scanning probe microscope comprising:
a cantilever of the scanning probe microscope, comprising:
a micro structure in which at least a part of the micro structure causes elastic deformation, said micro structure comprising:
a plurality of sensors to detect said elastic deformation by a tunneling effect, said plurality of sensors being positioned on a same surface of said part of the micro structure so that in at least two sensors of the plurality of sensors respective longer axes of each of members of said two sensors of said plurality of sensors cross at right angles mutually,
wherein each of said sensors comprises an insulating layer that forms a single tunneling baffler between a lower electrode and an upper electrode that have conductivity together;
wherein
when a front end of said cantilever is made to approach a specimen surface, said front end is made to scan the specimen in two dimensions relatively, and said scanning probe microscope detects a physical quantity working with said specimen surface and said front end of said cantilever as a deformation quantity.

14. The scanning probe microscope of claim 13, wherein said lower electrode and said upper electrode planarly face each other across said insulating layer that forms said single tunneling barrier.

15. The scanning probe microscope of claim 14, wherein thickness of said insulating layer that forms said single tunneling barrier is less than or equal to 2.5 nm.

16. The scanning probe microscope of claim 13, wherein at least a part of said micro structure has conductivity and is used for said upper electrode or said lower electrode.

17. The scanning probe microscope of claim 13, wherein said sensor detects said elastic deformation of said micro structure as a change of electric resistance by a change of tunneling current.

18. The scanning probe microscope of claim 13, wherein a resistance area product, that is the product of resistance and surface area, of the sensor is 100 k$\Omega \cdot \mu m^2$ or less.

19. A method for measuring deformation quantity for a micro structure comprising:
providing plural sensors to detect elastic deformations by a tunneling effect in the micro structure that causes the elastic deformation, said plurality of sensors being positioned on a same surface of said part of the micro structure so that in at least two sensors of the plurality of sensors respective longer axes of each of members of said two sensors of said plurality of sensors cross at right angles mutually; and
detecting the elastic deformation of each part of said micro structure as a change of electric resistance by the plural sensors,
wherein each sensor comprises an insulating layer that forms a single tunneling barrier between a lower electrode and an upper electrode that have conductivity together.

20. The method for measuring deformation quantity for the micro structure of claim 19, wherein at least a part of said micro structure has conductivity and is used for said upper electrode or said lower electrode.

* * * * *